Aug. 7, 1951  C. B. DOTY  2,563,222
ARM REST
Filed April 11, 1947  3 Sheets-Sheet 1
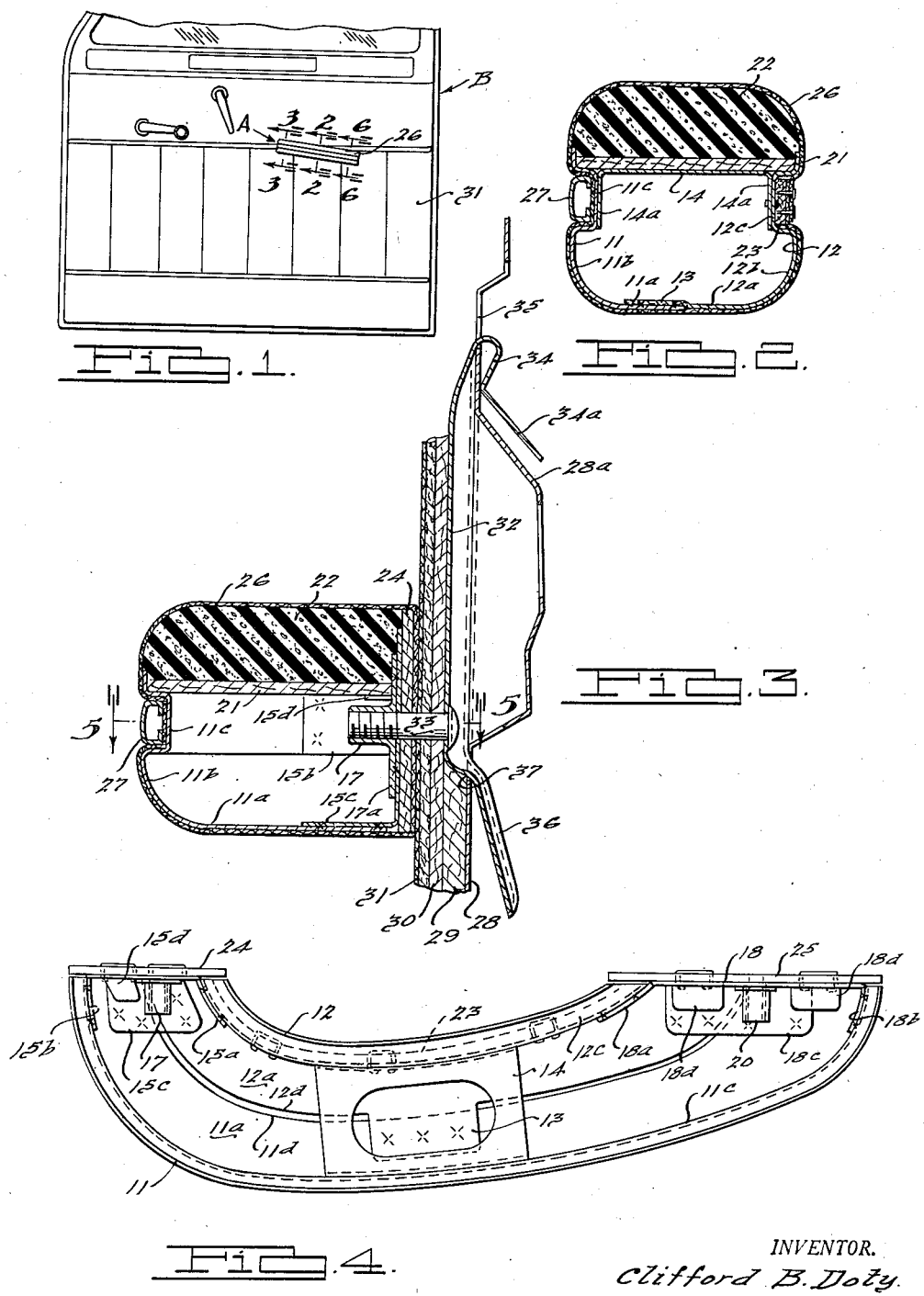
INVENTOR.
Clifford B. Doty.
BY
Elmer Jamison Gray
ATTORNEY.

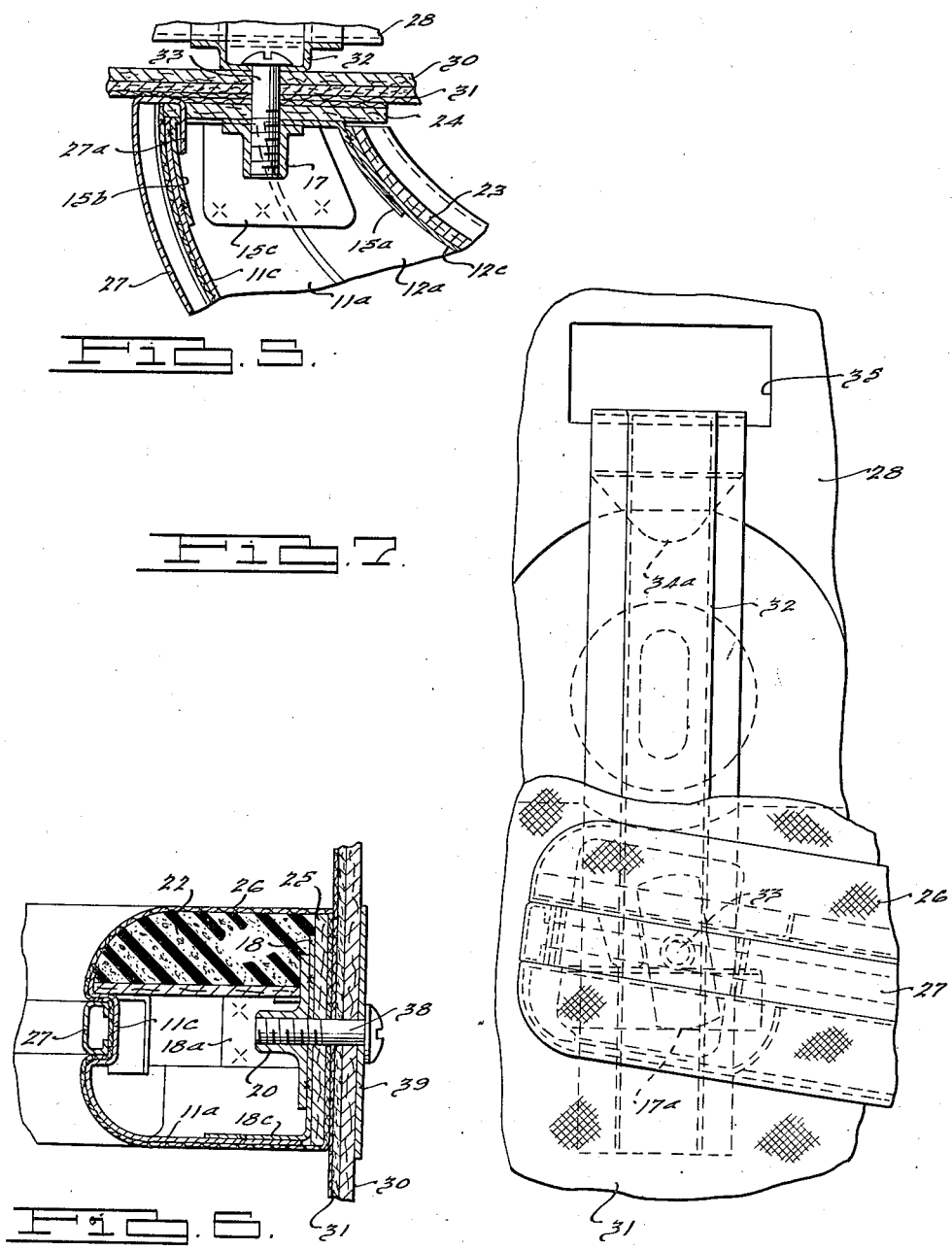

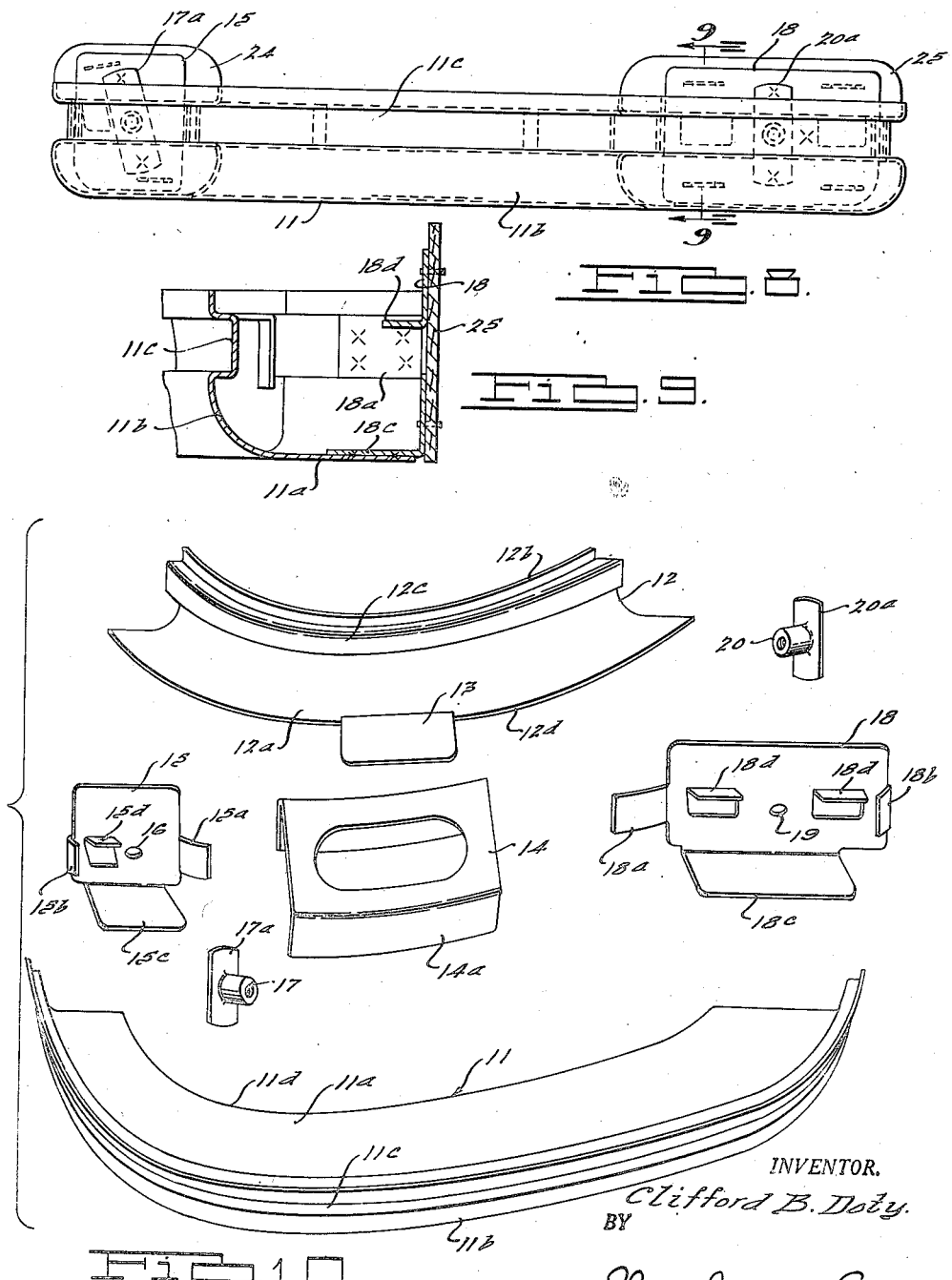

Patented Aug. 7, 1951

2,563,222

UNITED STATES PATENT OFFICE 2,563,222

ARMREST

Clifford B. Doty, Detroit, Mich., assignor to Briggs Manufacturing Company, Detroit, Mich., a corporation of Michigan Application April 11, 1947, Serial No. 740,857

8 Claims. (Cl. 155—198)

1

This invention relates to arm rests for vehicle bodies and in particular to arm rests adapted to be attached to the doors of automobile bodies, such as the front doors. An arm rest constructed in accordance with a preferred embodiment of the invention provides not only a convenient and comfortable rest for the arm of the car passenger or driver but also a hand grip member capable of being readily grasped to pull the door closed.

An object of the invention is to provide an arm rest having a frame of improved construction for supporting the padding and upholstery material, such frame being fabricated principally from a number of components stamped and pressed metal parts which may be economically manufactured and easily assembled to provide a strong and rigid hollow frame.

A further object of the invention is to provide an arm rest shaped to form a hand grip and comprising a hollow frame formed principally of two angularly shaped stampings which may be secured together in opposed relation to provide a channel shaped member open at its top and adapted to support in improved manner a top layer of padding, such as sponge rubber, which together with the frame is covered with a suitable fabric material.

Another object of the invention is to provide an arm rest comprising a padded, fabric covered upwardly opening channel shaped frame and improved means for attaching opposite ends of the frame to the vehicle door. In accordance with the preferred embodiment of the invention the ends of the arm rest are mounted upon and attached through concealed means directly to the inner trim panel of the door, the attaching means for one end, such as the front end, of the arm rest, however, including a device by means of which the arm rest may also be directly and releasably attached to the inner metal door panel. As a result of this improved construction the pull on the arm rest, when it is grasped to pull the door closed, is largely transmitted directly to the metal door panel since the releasable concealed attaching means at one end of the arm rest provides also a rigid connection between the trim panel and door panel.

Other objects of this invention will appear in the following description and appended claims, reference being had to the accompanying drawings forming a part of this specification wherein like reference characters designate corresponding parts in the several views.

Fig. 1 is a fragmentary inside elevation of the front door of an automobile body having attached thereto an arm rest constructed in accordance with one embodiment of the invention.

Fig. 2 is an enlarged section taken substantially through lines 2—2 of Fig. 1 looking in the direction of the arrows.

Fig. 3 is an enlarged section taken substantially through lines 3—3 of Fig. 1 looking in the direction of the arrows.

Fig. 4 is a plan view of the arm rest frame with the padding and upholstery removed.

Fig. 5 is a fragmentary section taken substantially through lines 5—5 of Fig. 3 looking in the direction of the arrows.

Fig. 6 is an enlarged section taken substantially through lines 6—6 of Fig. 1 looking in the direction of the arrows.

Fig. 7 is a fragmentary side elevation, partly broken away, illustrating the manner of attaching the front end of the arm rest to the vehicle door.

Fig. 8 is a front side elevation of the structure shown in Fig. 4.

Fig. 9 is a fragmentary section taken substantially through lines 9—9 of Fig. 8 looking in the direction of the arrows.

Fig. 10 is an exploded view illustrating in perspective the component parts of the arm rest frame.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

There is illustrated in the drawings, by way of example, an arm rest A constructed in accordance with one embodiment of the present invention and adapted to be attached to the inside of a vehicle door, such as the front door B of an automobile body. The arm rest of the present embodiment comprises a hollow upwardly opening channel shaped frame preferably fabricated from a number of component parts which, as shown in Fig. 10, are in the form of metal stampings. This frame comprises an inner angle frame member 11 and an outer angle frame member 12 which are correspondingly curved or bowed inwardly of the door so as to enable the arm rest to serve the purposes of both an arm rest and a hand grip. The inner frame member 11 is generally in the form of an angle and comprises a bottom flange 11a and an upwardly extending side wall 11b which is provided throughout its length with a channel or groove 11c of suitable depth. Similarly, the outer frame member 12 is generally in the form of an angle having a bottom flange 12a and an upright side wall 12b which is formed throughout its length with a groove or channel 12c of suitable depth. The marginal edge 11d of the bottom flange 11a has a curvature corresponding to the curvature of the marginal edge 12d of the bottom flange 12a and when the two frame members 11 and 12 are assembled together, as illustrated in Fig. 4, these edges are arranged in abutting or opposed relationship and may, if desired, be slightly spaced apart as shown in Fig. 4. The bottom flange 12a of the frame member 12 is provided centrally thereof with a projecting tab 13 which is offset upwardly to the thickness of the metal so as to overlie the bottom flange 11a, thereby causing the flanges 11a and 12a to lie flush with each other. The tab 13 is secured to the flange 11a by spot welding. Interposed between the frame members 11 and 12, centrally thereof, is a channel brace or tie piece 14 provided with depending side flanges 14a abutting against the channel portions 11c and 12c and spot welded thereto. The side flanges 14a of the channel brace are curved to conform to the curvature of the side walls of the frame members, and as a result the channel brace has a snug and uniform fit against the inner surfaces of the channel portions 11c and 12c. The top web of the brace 14, as shown in Fig. 2, lies flush with the top surfaces of the channel portions 11c and 12c.

The open front end of the frame members 11 and 12, when assembled together, is closed by means of a front connecting piece 15 which is insertable between the upright side walls 11b and 12b as shown in Fig. 4. The front end closure piece 15 is provided with a curved projecting tab or tongue 15a engaging smoothly the inner curved surface of the groove or channel 12c. The closure piece 15 also has a projecting curved tab 15b engaging smoothly the inner surface of the channel or groove 11c. The tabs 15a and 15b, as shown in Fig. 10, project from opposite side edges of the piece 15 and are spot welded to the side walls of the frame members at the locality of the channel or groove portions 11c and 12c. Projecting from the lower edge of the closure piece 15 is a tab 15c which overlies the bottom flanges 11a and 12a and is spot welded thereto. Lanced out of the metal of the closure piece 15 is a tab 15d which extends a suitable distance inwardly into the space between the frame members. The upper surface of the tab 15d lies in the plane of the upper surfaces of the channel portions 11c and 12c and forms therewith a support for the arm rest pad as hereinafter pointed out. The closure plate 15 has a hole 16 registering with a tapped hole in a screw boss 17 which through the medium of its base 17a is secured to the inside of the plate 15 as by means of spot welding.

The open rear end of the frame members 11 and 12 is closed by means of a closure plate 18 which, as in the case of the closure plate 15, connects the ends of the frame members together. As shown in Figs. 4 and 10, the closure plate 18 is provided at opposite edges with inwardly projecting curved tabs 18a and 18b. The tab 18a engages smoothly the inner surface of the channel portion 12c of the frame member 12 and is spot welded thereto. The tab 18b engages smoothly the inner surface of the channel or groove portion 11c and is spot welded thereto. The closure plate 18 is provided with two inwardly extending laterally spaced tabs 18d which are lanced out of the metal of the plate. The upper surfaces of these tabs lie in the plane of the upper surfaces of the channel portions 11c and 12c so as to provide therewith rests for the arm rest pad. Projecting from the lower edge of the plate 18 is a tab 18c which overlies the bottom flanges 11a and 12a of the frame members and is spot welded thereto. The plate 18 has a hole 19 registering with a tapped hole in a screw boss 20 secured through the medium of its base 20a to the inside of the plate 18, as by means of spot welding.

The upper side of the arm rest is cushioned by means of a pad supported upon a foundation strip 21 of suitable material, such as fiber board. The foundation strip, as shown in Figs. 2 and 3, fits between the upper edges of the side walls of the frame members 11 and 12 and, accordingly, the edges of the foundation strip are contoured so as to have the curvature of these side walls. The foundation strip at opposite ends rests upon the tabs 15d and 18d. The edges of the foundation strip rest upon the upper surfaces of the inwardly directed channel portions 11c and 12c and the central portion of the foundation strip engages the upper surface of the channel brace 14. Mounted upon the foundation strip 21 is a pad or cushion 22 which is preferably formed of sponge rubber. If desired, the pad 22 may be cemented to the foundation strip 21 so as to facilitate assembly with the frame structure of the arm rest.

Extending within the channel or groove portion 12c of the frame member 12 is a tacking strip 23. This tacking strip preferably extends the full length of the frame member 12 and is secured in place by staples. Also stapled to the outer face of the front end closure plate 15 is a tacking strip 24. Similarly, a tacking strip 25 is stapled to the outer face of the rear end closure plate 18.

After the tacking strips 23, 24 and 25 have been attached in position and the pad 22 with its foundation strip 21 installed as shown in Fig. 2, the entire assembly is covered with upholstery cloth or fabric 26. The fabric is drawn taut around the assembly and the overlapped ends tacked securely to the tacking strip 23. After the fabric 26 has been secured in position an ornamental metal molding strip 27, preferably channel shaped in cross section, is forced into the groove or channel 11c so as to draw the cloth taut around the front or exposed inner side of the arm rest. The ends of the molding have projecting portions which are bent back upon themselves and clinched around the ends of the frame member 11 as shown at 27a in Fig. 5. These ends of the molding pass through slits in the tacking strips 24 and 25.

The arm rest, as preferably constructed in the above manner, is attached to the inner removable door trim panel which in turn is attached in the usual manner by fastener devices to the inner metal door panel 28, see Fig. 3. This door panel in the present instance has an outwardly embossed portion 28a below which is a layer of filler material 29, such as jute, cemented to the panel.

The inside trim panel, which covers the metal door panel 28, is of any conventional construction comprising, for example, a foundation board 30 of fibrous material to which is cemented a fabric covered layer of padding or wadding 31. Mounted against the back side of the foundation board 30 of the trim panel is an attaching plate or bar 32 which may be ribbed or channelled centrally for reinforcement purposes. This plate or bar is secured to the trim panel and also to the arm rest through the medium of a screw 33 threaded into the screw boss 17. The attaching plate 32 at its upper end has a spirng hook 34 terminating in an outwardly and downwardly inclined pilot extension 34a. In attaching the upper end of the plate or bar 32 to the inner door panel 28 the pilot portion 34a is inserted through an aperture 35 and the hook 34 is drawn down tightly so as to grip the lower edge of the metal below the aperture 35, as shown in Fig. 3. The lower end of the plate or bar 32 has an outwardly and downwardly inclined tongue 36 which passes through an aperture 37 in the inner door panel. When installing the arm rest the portions 34a and 36 are inserted through the apertures 35 and 37 and then the arm rest is forced down to clamp it into position.

The rear end of the arm rest is attached directly to the trim panel 30, 31 in the manner shown in Fig. 6. This is accomplished by means of a screw 38 passing through the trim panel and threaded into the screw boss 20. The head of the screw engages a large metal washer 39. From the foregoing it will, therefore, be seen that when the arm rest is installed on the door the forward end thereof, as shown in Fig. 3, is attached both to the trim panel as well as the inner metal door panel whereas the rear end of the arm rest is only attached directly to the trim panel. It will be understood that the arm rest is first mounted upon the trim panel in the manner shown in Figs. 3 and 6, and when the trim panel is installed on the door through the usual spring snap fasteners the attaching plate 32 is also installed on the inner metal door panel 28.

I claim:

1. An arm rest for a vehicle body, comprising a longitudinally curved upwardly opening channel shaped frame having opposite side walls formed with longitudinal grooves to provide seats, a cushion pad fitting into the upper part of said frame and resting on said seats, fabric material covering said frame and pad, and a molding fitting into one of said grooves against the fabric material.

2. An arm rest for a vehicle body, comprising a longitudinally curved upwardly opening channel shaped frame having opposite side walls formed with longitudinal grooves to provide seats, a cushion pad fitting into the upper part of said frame and resting on said seats, fabric material covering said frame and pad, a molding fitting into one of said grooves against the fabric material, and a tacking strip for said material fitting into the other groove.

3. An arm rest for a vehicle door, comprising an upwardly opening channel shaped frame having a bottom and spaced inner and outer side walls, projecting means pressed from the metal of said side walls and forming seats lying in a common plane within said frame, and a cushion pad fitting into said frame and resting on said seats.

4. An arm rest for a vehicle door, comprising an upwardly opening channel shaped frame having a bottom and spaced inner and outer side walls, said frame being curved to provide a hand grip intermediate the ends of the frame, projecting means pressed from the metal of said side walls and forming seats lying in a common plane within said frame, and a cushion pad fitting into said frame and resting on said seats.

5. An arm rest for a vehicle door, comprising an upwardly opening channel shaped frame having a bottom and spaced inner and outer side walls, projecting means pressed from the metal of said side walls and forming seats lying in a common plane within said frame, and a cushion pad fitting into said frame and resting on said seats, said frame comprising a pair of pressed metal members secured together in opposed relation.

6. An arm rest for a vehicle door, comprising an upwardly opening channel shaped frame having a bottom and spaced inner and outer side walls, projecting means pressed from the metal of said side walls and forming seats lying in a common plane within said frame, and a cushion pad fitting into said frame and resting on said seats, said projecting means including a longitudinal groove adapted to receive a tacking strip for fabric covering.

7. An arm rest for a vehicle door, comprising a pair of generally angle shaped members having spaced correspondingly curved side walls and bottom flanges arranged in opposed relation, said members being secured together to form an upwardly opening channel, and a cushion pad fitting into said channel and including a foundation member seated upon projections formed from the metal of said members.

8. In an arm rest for a vehicle door, a pair of generally angle shaped members having spaced correspondingly curved side walls and bottom flanges arranged in opposed relation, said members being secured together to form an upwardly opening channel, a pair of metal pieces joining the corresponding ends of said walls, and a cushion pad seated upon projections formed from the metal of said walls.

CLIFFORD B. DOTY.

REFERENCES CITED

The following references are of record in the file of this patent:

UNITED STATES PATENTS

| Number | Name | Date |
| --- | --- | --- |
| 1,221,748 | Kohler | Apr. 3, 1917 |
| 2,203,413 | Hood | June 4, 1940 |
| 2,325,292 | Westrope | June 27, 1943 |